(12) United States Patent
Munson et al.

(10) Patent No.: US 9,983,956 B2
(45) Date of Patent: May 29, 2018

(54) METHOD AND APPARATUS FOR REDUNDANCY IN AN ATM USING HOT SWAP HARDWARE UNDERLYING A VIRTUAL MACHINE

(71) Applicant: Bank of America Corporation, Charlotte, NC (US)

(72) Inventors: Nicholas J. Munson, Charlotte, NC (US); David W. Twigg, Charlotte, NC (US); Daniel J. Farinella, III, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 46 days.

(21) Appl. No.: 14/997,647

(22) Filed: Jan. 18, 2016

(65) Prior Publication Data

US 2016/0132404 A1    May 12, 2016

Related U.S. Application Data

(60) Continuation of application No. 14/221,464, filed on Mar. 21, 2014, now Pat. No. 9,514,011, and a division of application No. 13/015,757, filed on Jan. 28, 2011, now Pat. No. 8,689,039.

(51) Int. Cl.
| | |
|---|---|
| *G06F 11/00* | (2006.01) |
| *G06F 11/20* | (2006.01) |
| *G07F 19/00* | (2006.01) |
| *G06F 11/14* | (2006.01) |

(52) U.S. Cl.
CPC ........ *G06F 11/203* (2013.01); *G06F 11/1402* (2013.01); *G07F 19/20* (2013.01); *G07F 19/211* (2013.01); *G06F 2201/805* (2013.01); *G06F 2201/815* (2013.01)

(58) Field of Classification Search
CPC .................................................. G06F 11/203
See application file for complete search history.

(56) References Cited

U.S. PATENT DOCUMENTS

| | | | | |
|---|---|---|---|---|
| 6,953,150 B2 * | 10/2005 | Shepley | .................. | G07F 19/20 235/379 |
| 7,197,613 B2 * | 3/2007 | Shibuya | ................ | G06F 11/004 711/100 |
| 7,677,447 B2 * | 3/2010 | MacPhail | ............... | G06Q 20/00 235/375 |
| 8,135,985 B2 * | 3/2012 | Mishra | ................ | G06F 11/1438 714/13 |
| 8,251,196 B2 * | 8/2012 | Dietz | ....................... | G07D 7/00 194/206 |
| 8,352,952 B2 * | 1/2013 | Hanquez | ............. | G06F 9/45533 718/1 |

(Continued)

*Primary Examiner* — Christopher McCarthy
(74) *Attorney, Agent, or Firm* — Weiss & Arons LLP; Michael A. Springs, Esq.

(57) ABSTRACT

A method and apparatus for providing redundancy in an Automatic Teller Machine (ATM) is provided. Application software may be run on top of a virtual environment such as a virtual machine and/or a virtual disk environment. Should a software component fail, the virtual environment will "crash" but the ATM hardware and operating system will remain intact. If the software is fatally flawed—e.g., due to a faulty "upgrade" the older version may be "rolled back" from a previously stored virtual environment.

8 Claims, 7 Drawing Sheets

(56) References Cited

U.S. PATENT DOCUMENTS

| | | | |
|---|---|---|---|
| 8,683,172 B2* | 3/2014 | Hashimoto | G06F 9/5077 711/173 |
| 2003/0176213 A1* | 9/2003 | LeMay | G07F 17/32 463/20 |
| 2004/0172574 A1* | 9/2004 | Wing | G06F 11/2025 714/4.12 |
| 2006/0212747 A1* | 9/2006 | Okamoto | G06F 11/1092 714/6.12 |
| 2006/0281541 A1* | 12/2006 | Nguyen | G07F 17/32 463/25 |
| 2008/0114659 A1* | 5/2008 | Pitroda | G06Q 20/04 705/21 |
| 2008/0121692 A1* | 5/2008 | MacPhail | G06Q 20/00 235/379 |
| 2009/0172781 A1* | 7/2009 | Masuoka | H04L 63/105 726/3 |
| 2009/0199044 A1* | 8/2009 | Hurrell | G07F 9/02 714/23 |
| 2010/0198708 A1* | 8/2010 | Tabachnik | G07D 1/02 705/30 |
| 2010/0258621 A1* | 10/2010 | Schlabach | G06Q 10/06 235/379 |
| 2010/0325471 A1* | 12/2010 | Mishra | G06F 11/1438 714/3 |
| 2011/0047548 A1* | 2/2011 | Traut | G06F 11/1438 718/1 |
| 2011/0151895 A1* | 6/2011 | Kleperis | H04W 4/02 455/456.6 |
| 2011/0296440 A1* | 12/2011 | Laurich | G06F 21/602 719/326 |
| 2012/0160913 A1* | 6/2012 | Shepley | G07F 19/20 235/379 |
| 2013/0111474 A1* | 5/2013 | Agarwal | G06F 9/45558 718/1 |

* cited by examiner

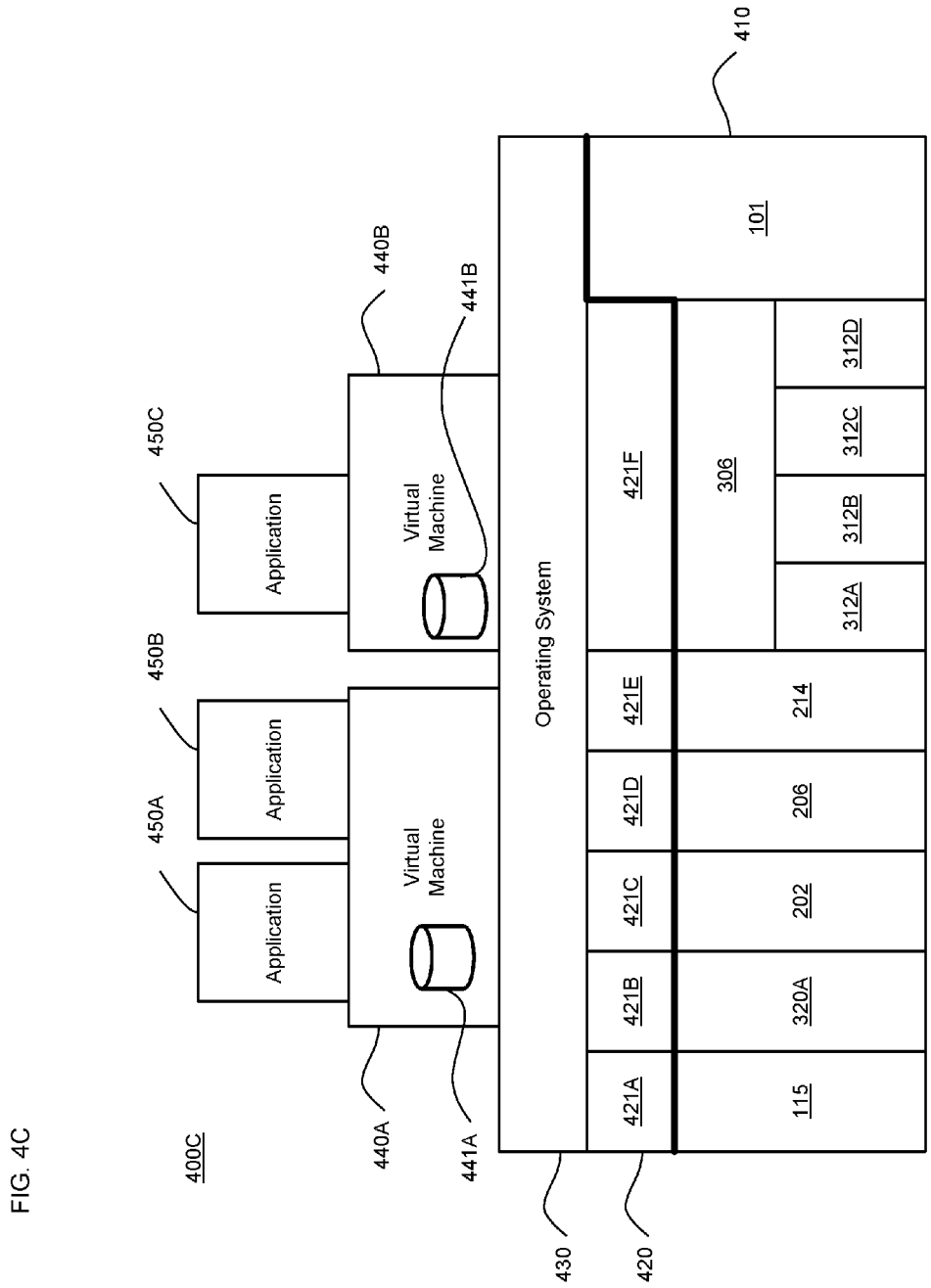

METHOD AND APPARATUS FOR REDUNDANCY IN AN ATM USING HOT SWAP HARDWARE UNDERLYING A VIRTUAL MACHINE

CROSS-REFERENCE

This is a continuation of currently-pending, commonly-assigned U.S. patent application Ser. No. 14/221,464, filed Mar. 21, 2014, which is a divisional of commonly-assigned U.S. patent application Ser. No. 13/015,757, filed Jan. 28, 2011, now U.S. Pat. No. 8,689,039. U.S. application Ser. Nos. 13/015,757 and 14/221,464 are incorporated by reference herein in their respective entireties.

FIELD OF TECHNOLOGY

This invention relates to redundancy systems for Automated Teller Machines (ATMs) based on hot swaps and virtual environments.

BACKGROUND OF THE INVENTION

ATMs are a specialized computer based systems utilizing a hardware platform and software. The software may include an operating system and one or more application programs. The hardware platform consists of a computer and one or more electro-mechanical devices. The operating system is a program that runs on the computer, which creates an environment for the application programs.

At times the hardware platform may develop a fault or require maintenance. Typically the ATM is powered down and the faulty part is replaced, followed by a reboot of the operating system and application programs. It is desirable not to lose access to ATM functionality during the repair process.

One solution used is to allow a "hot swap" of components. A hot swap is the removal and replacement of a component while the ATM is still powered. A hot swappable hardware platform will not sustain damage during the hot swap process. Even more useful is an ATM that will continue to run the operating system and application programs during the hot swap process. Typical operating systems and/or programs rely on a consistent underlying hardware platform and do not tolerate the hot swap process.

Another problem with current ATM maintenance cycles is a fault in an updated version of the operating system or an application program. In this case it is desirable to restore the previous version of the software—e.g., the application program. This "rollback" process relies on keeping an older version of the software available along with any required system data. However, rollback of the software may require powering down the ATM and loss of the use of the ATM during the repair process.

It would be desirable, therefore, to provide an apparatus and methods that allow hot swapping of ATM components without interrupting access to the ATM. It would also be desirable to allow rollback, and upgrade of the operating system and application software without interrupting access to the ATM.

SUMMARY OF THE INVENTION

An ATM, substantially as shown in and/or described in connection with at least one of the figures, as set forth more completely in the claims. The ATM may include mechanisms that allow hot swapping of hardware components without interrupting access to the ATM. Additionally the ATM may allow rollback, or upgrade of the operating system and application software without interrupting access to the ATM.

On a hot swappable platform, according to the invention, an ATM could function in a degraded state during non-critical hardware replacement. Once hardware is replaced the machine would return to full functionality.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 4C shows an exemplary architecture of an ATM utilizing a virtual environment.

DETAILED DESCRIPTION OF THE DISCLOSURE

Apparatus and methods for improving the uptime and reducing maintenance costs of an ATM are provided. ATM hardware and software that support hot swapping of hardware components are provided.

Additionally, software rollback systems are also provided. The software rollback is enabled by providing one or more virtual environments utilizing the hardware platform. The application software of ATM may preferably run within a virtual environment.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software/firmware embodiment or an embodiment combining software, firmware, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, EEPROM, Flash memory, SRAM, DRAM, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media—e.g., air and/or space.

Figure 1:
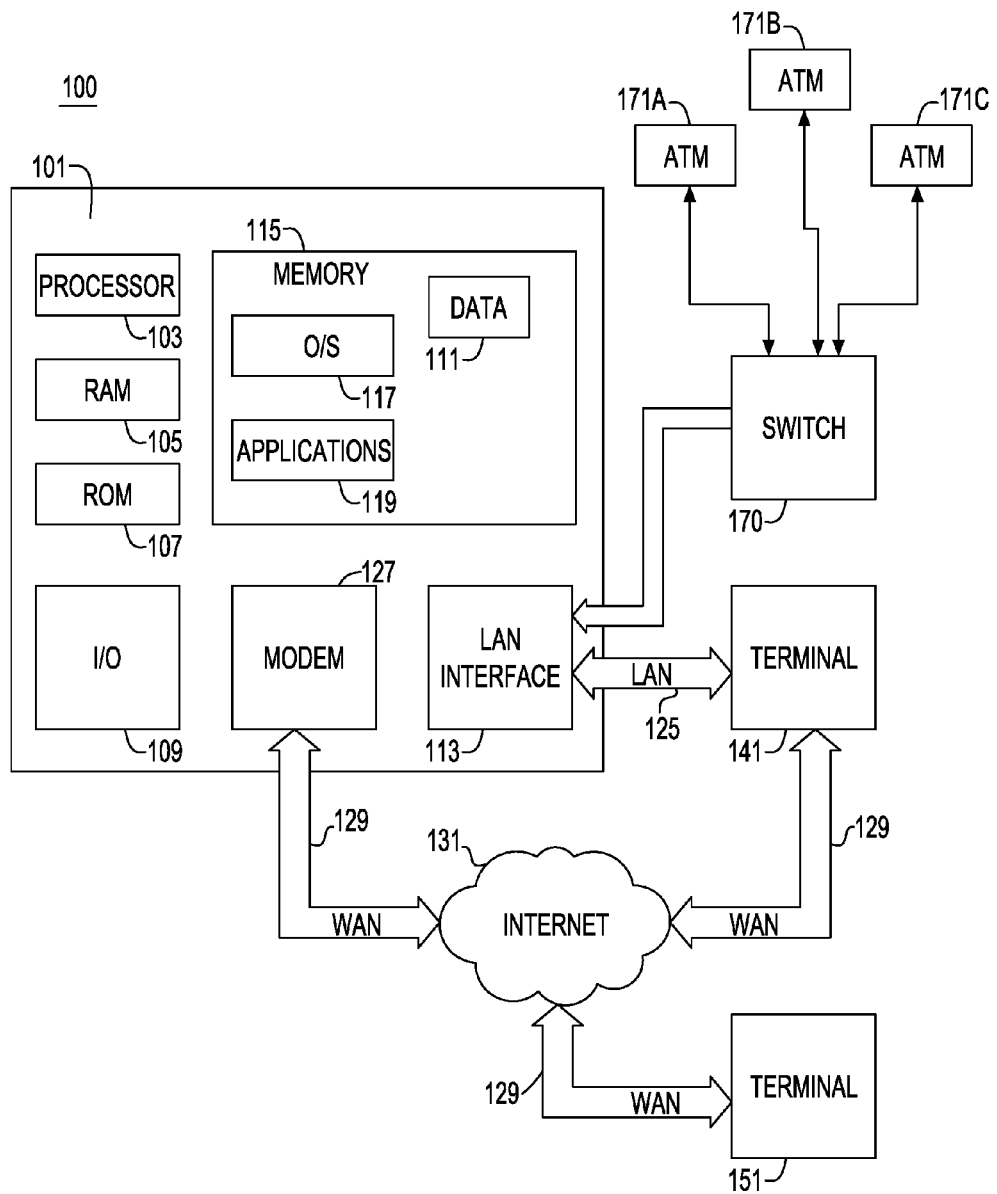
FIG. 1 shows a schematic diagram of the hardware and software components of an ATM.

FIG. 1 is an illustrative block diagram of an ATM system 100 based on a computer 101. The computer 101 may have a processor 103 for controlling the operation of the ATM and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the ATM computer 101.

The memory 115 may be comprised of any suitable permanent storage technology—e.g., a hard drive. The memory 115 stores software including the operating system 117 any application(s) 119 along with any data 111 needed for the operation of the ATM system 100. Alternatively, some or all of ATM computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output. I/O module 109 may include connectivity to devices which read ATM cards or devices which dispense and/or handle items—e.g., currency in bill or coin form.

ATM system 100 may be connected to other ATMs via a LAN interface 113. The LAN interface 113 may connect to switch 170. Several similar ATMs 171A, 171B, and 171C may be connected to switch 170 and may reside in close physical proximity to ATM system 100.

ATM system 100 may operate in a networked environment supporting connections to one or more remote computers, such as terminals 141 and 151. Terminals 141 and 151 may be personal computers or servers that include many or all of the elements described above relative to ATM system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be mobile devices including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information. Terminals 151 and/or terminal 141 may be other ATMs. These ATMs may be identical to ATM system 100 or different. The differences may be related to hardware components and/or software components.

Figure 2:
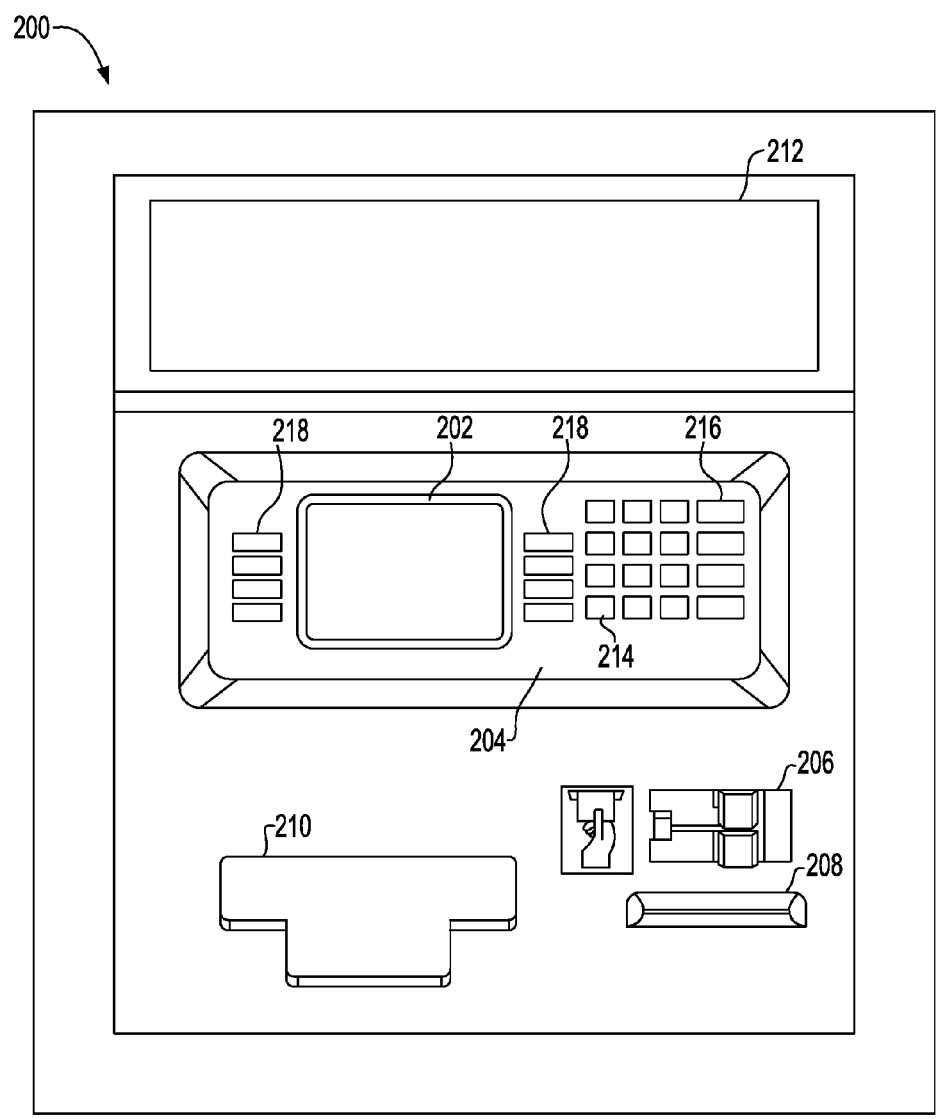
FIG. 2 shows a diagram of a interface for an ATM.

FIG. 2 shows an illustrative ATM interface 200 comprising a portion of the I/O devices connected to a computer 101. Interface 200 may include a monitor 202, a keyboard 204, a card reader 206, a document acceptor 208, an item dispenser 210 and security screen 212.

Monitor 202 may exchange visual and or audio information with a customer. Keyboard 204 may include alphanumeric keys 214 for the customer to enter numerical and textual data. Keyboard 204 may include control keys 216. In some embodiments, control keys 216 may be used to communicate control information, such as instructions, to computer 101. Keyboard 204 may include soft keys 218. Soft keys 218 may have functions that are dictated by programming and are presented to the customer using information that may be displayed on monitor 202.

Card reader 206 may be one of the I/O devices connected to computer 101. The card reader may read magnetically encoded information on transaction instruments such as ATM cards (bank cards). In some embodiments, interface 200 may include a contactless chip reader, a wireless transceiver or any other suitable interface for exchanging transaction information with a transaction instrument. The transaction instrument may be a chip, an RFID tag, a smart card, a PDA, a telephone or any other suitable device.

In some embodiments, interface 200 may include a biometric sensor (not shown). The biometric sensor may identify a customer based on a feature, such as an anatomical feature, of the customer. For example, the biometric sensor may be configured to identify the customer based on all or part of a face, a fingerprint, an iris, a retina, a hand or any other suitable anatomical feature. The biometric sensor may identify the customer based on a behavioral feature such as a signature, a voice, a gait or any other suitable behavioral feature.

Document acceptor 208 may accept any suitable document(s). For example, document acceptor 208 may accept envelopes, deposit forms, bills, checks or any other suitable document. In some embodiments, document acceptor 208 may feed into a scanner that digitizes the documents for image-based transaction processing.

Item dispenser 210 may dispense items. For example, item dispenser 210 may dispense bills.

Security screen 212 may visually screen a surveillance device (not shown). The surveillance device may provide suitable information—e.g., video—about individuals that are present near the self-service device and the conditions there.

Figure 3:
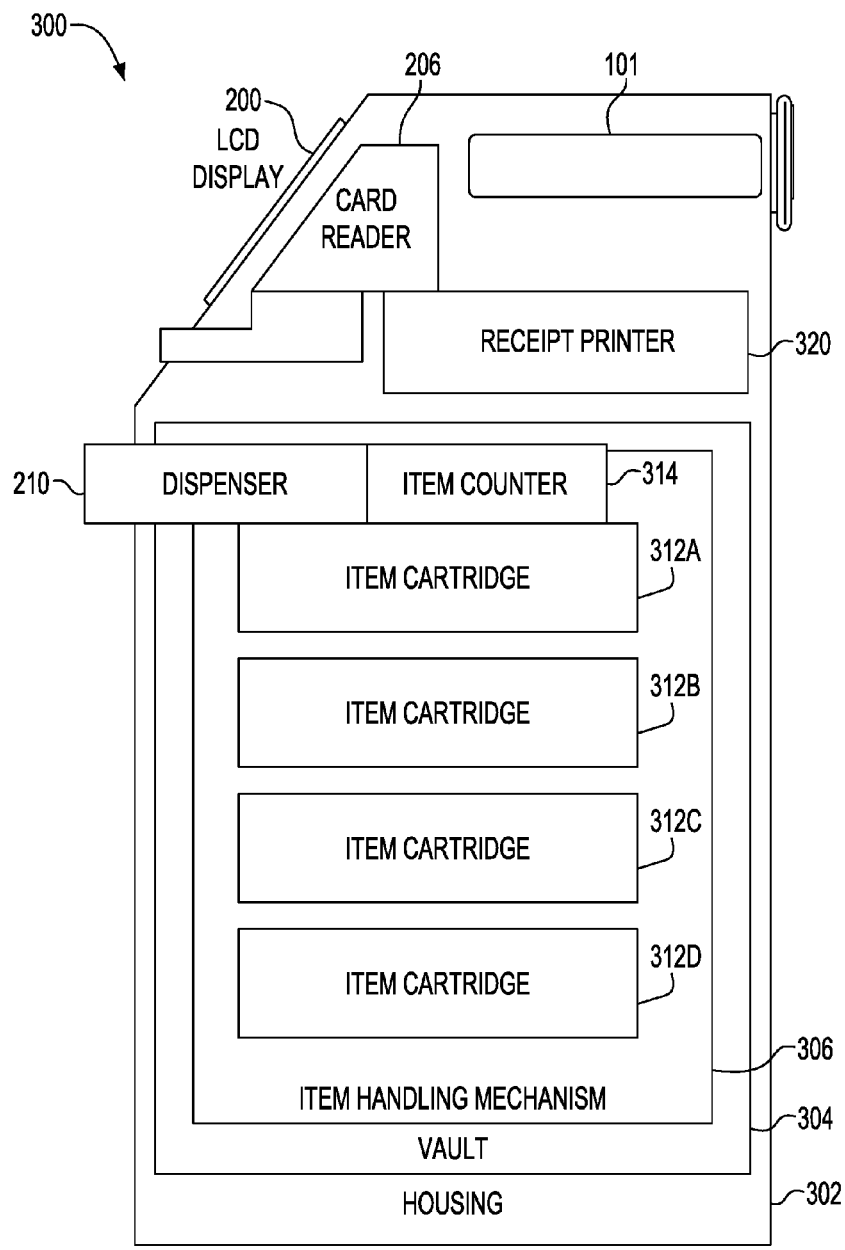
FIG. 3 shows a schematic diagram of an ATM.

FIG. 3 shows illustrative embodiment of an ATM 300. ATM 300 may have one or more of the features of interface 200 (shown in FIG. 2). ATM 300 may include housing 302 and may include vault 304. Vault 304 may contain items (not shown). Item handling mechanism 306 may be present in vault 304. Item handling mechanism 306 may store, arrange, dispense and/or otherwise handle items for dispensing from interface 200. For example, item handling mechanism 306 may include conveyors (not shown) for positioning and repositioning items for dispensing by item dispenser 210. Similarly, item handling mechanism 306 may include conveyors (not shown) for positioning and repositioning items received from a document acceptor 208 (shown in FIG. 2).

Items (not shown) in item handling mechanism 306 may be contained in item cartridges 312A-312D. For example, when the items are bills, item cartridges 312A-312D may be cash cartridges.

Item handling mechanism 306 may include item counter 314. Item counter 314 may count items prior to dispensing by dispenser 210.

ATM 300 may include interface 200 for customer interaction. Card reader 206 may be present for receiving transaction information from the customer via a suitable transaction instrument. ATM 300 may include receipt printer and dispenser module 210. Receipt printer and dispenser module 210 may provide the customer with a record of a transaction. ATM 300 may include computer 101 which may control customer I/O, dispensing processes, which may include initialization, actuation, dispensing and any other suitable processes, receipt printing and dispensing, transaction channel communications and any other suitable processes. Each type of device—e.g., the interface 200, or the card reader 206 may be a USB device.

Although the foregoing description is related to an ATM, any other self service device or computer based system is a possible embodiment of the invention and is included within the scope of the invention.

Typical hardware/software ATMs require a stable hardware environment. If a portion of the hardware fails or is removed from the ATM, while the ATM is operating, the operating system can no longer function and crashes. In some systems the operating system may issue a warning prior to shutdown. Any change in the hardware system requires a shutdown and reboot of the system. The loss of ATM accessibility during the shutdown and reboot process is undesirable.

Figure 4A:
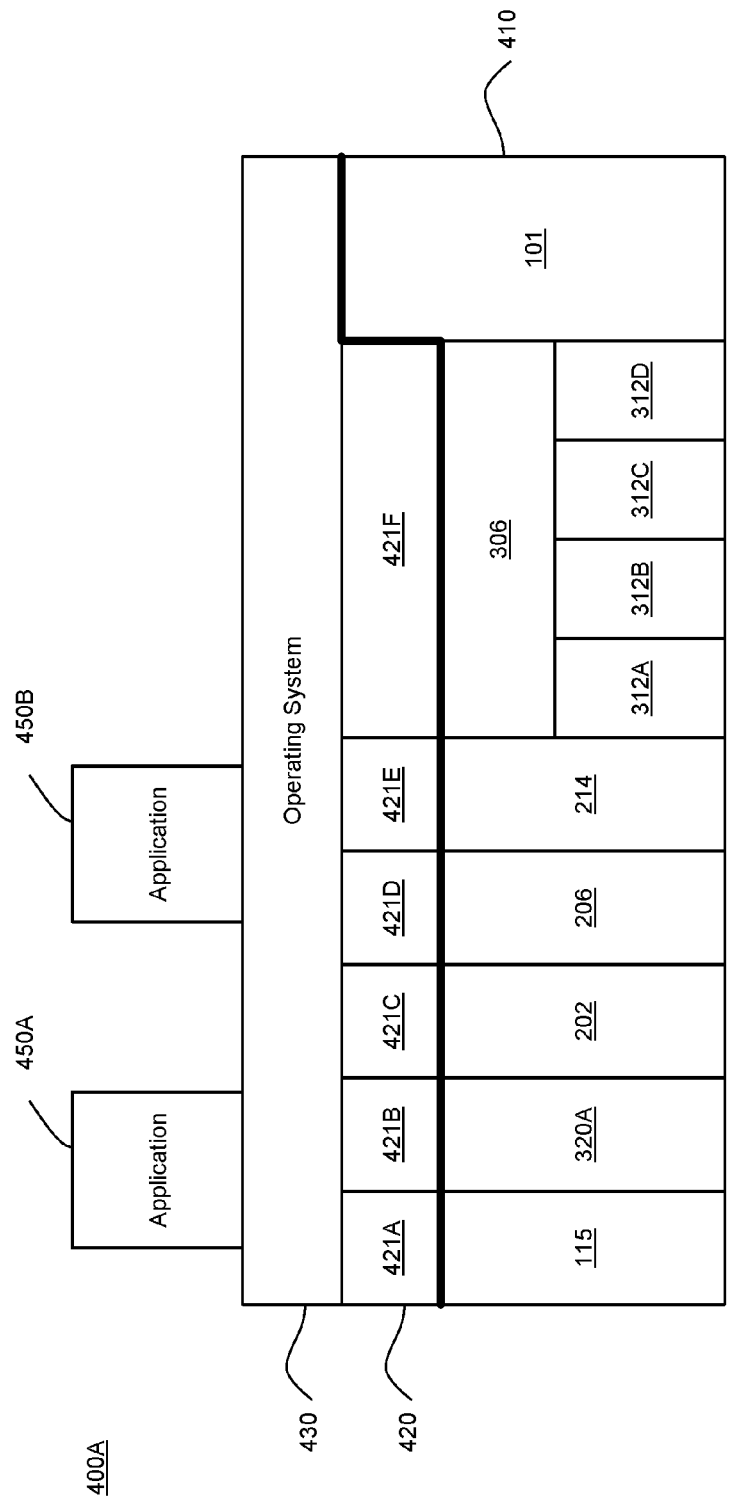
FIG. 4A shows an exemplary architecture of an ATM.

FIG. 4A shows an embodiment of an ATM system 400A, or simply ATM 400A. The ATM 400A is based on an underlying hardware layer 410. Hardware layer 410 may contain elements depicted in FIG. 1-3. An example hardware layer may contain memory 115, receipt printer 320, display 202, keyboard 204, card reader 206 and computer 101. The elements of hardware layer 410 may be accessed by a driver layer 420. Driver layer 420 is typically comprised of individual drivers, 421A-421F, one for each type of hardware—e.g., one driver for the keyboard 204, a second driver for the receipt printer 320 etc. Some portions of the hardware layer 410 may not require a driver—e.g., the computer 101. The drivers may be USB drivers or any other suitable device driver.

Some of the devices in the hardware layer may interface to subsidiary hardware devices e.g., item handling mechanism 306 interfaces to item cartridges 312A-312D. In one embodiment a hardware device may relay all signals from the subsidiary device to the a single driver—e.g., item cartridges 312A-312D interface to item handling mechanism 306 which interfaces to driver 421F. In other embodiments all hardware devices may connect to different drivers.

The operating system 430 is dependent on the driver layer 420. It is also possible to combine the driver layer 420 with the operating system 430. Applications 450A and 450B run on top of the operating system 430. An exemplary application may be the user interface program for the ATM 400A. The interface of the hardware 410 to the applications 450A and 450B is typically accessed via operating system 430. This is a typical configuration for many computer based systems.

Although only two applications 450A and 450B are shown; this is an exemplary number. In principle any number of applications are possible. Likewise, although only one operating system 430 is shown, multiple operating systems are possible, including those in a "dual boot" configuration. Each operating system may include its own drivers or rely on a common driver layer. Multiple hardware platforms or computers 101 may be used in a redundant or parallel processing arrangement under the control of one or more operating systems. Each of the foregoing are contemplated and are included within the scope of the invention.

Figure 4B:
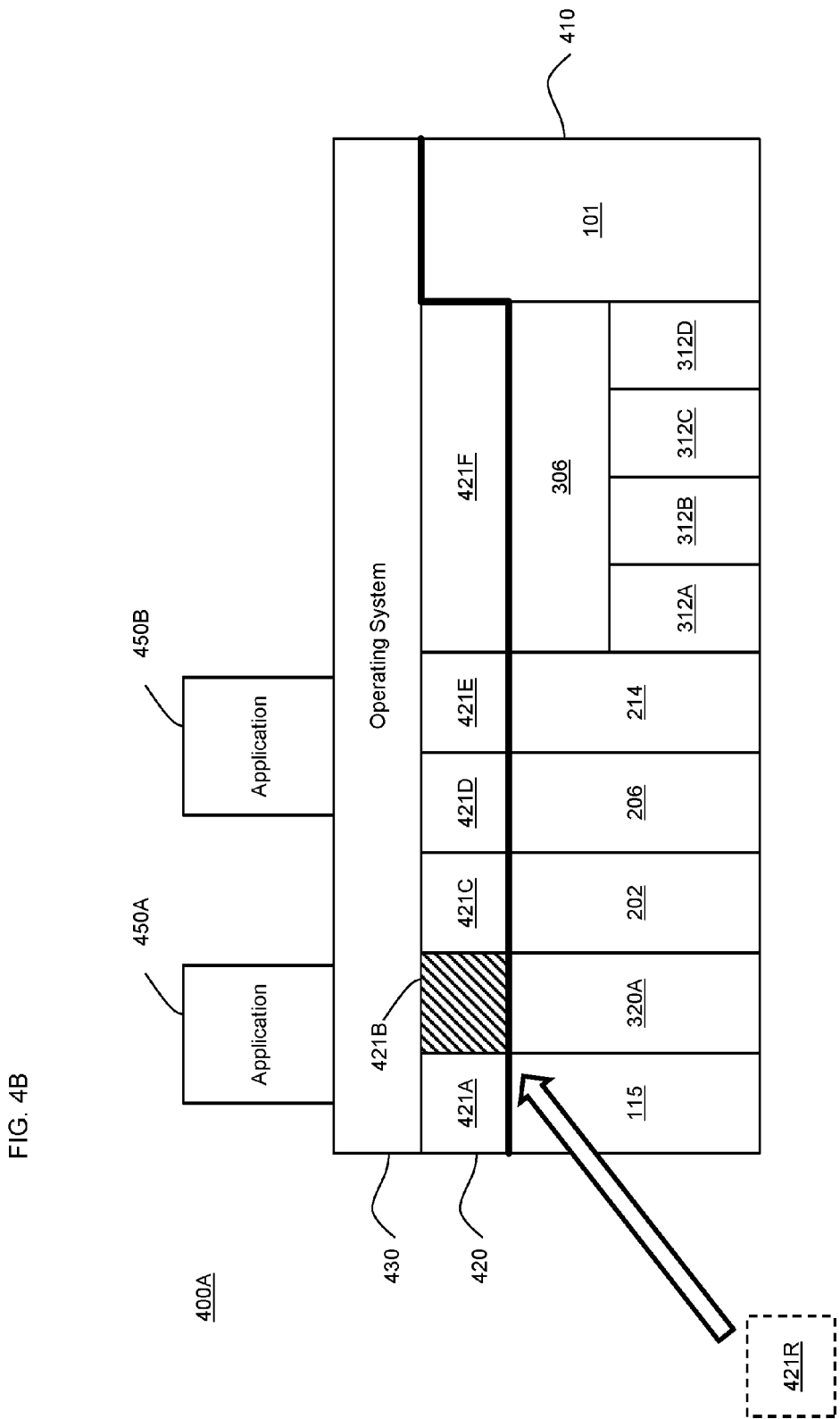
FIG. 4B shows an exemplary architecture of an ATM demonstrating the update of driver software.

The ATM system 400A maintains service via a hot swap mechanism. The consequences of an exemplary hardware failure are shown in FIG. 4B. When a portion of hardware—e.g., the receipt printer 320—fails, the driver—e.g., driver 421B—dedicated to that portion of the hardware detects the failure. The driver 421B signals the failure to operating system 430. The operating system 430 may then compensate for the loss of the hardware and/or orchestrate repairs without crashing the ATM system 400A. Other events such as emptying of an item cartridge—e.g., 312B—may also be detected. Preferably all drivers, and devices are pre-certified, and support included therefor, in the operating system.

Operating system 430 may orchestrate repairs by signaling via an attached network—e.g., WAN 129 of FIG. 1. Insertion of a replacement part may also signal the operating system. The replacement part—e.g., receipt printer 320A may be inserted without removing power from the ATM. When the replacement part 320A signals the operating system 430, the operating system searches for a suitable driver. If the replacement part is identical to the failed part then the driver will be available—e.g., existing driver 421B. If the replacement part 320A is different from the part replaced, a new driver—e.g., replacement driver 421R—may already be stored within ATM 400A, for instance in memory 115. If the driver is not stored within the ATM 400A, the operating system requests the replacement driver 421R from locally available machines possibly using LAN 125 of FIG. 1. If the replacement driver 421R is not available locally the operating system 430 requests the replacement driver 421R from other available source(s) possibly using WAN 129 of FIG. 1. If the replacement driver 421R is not available from any connected resource the operating system 430 will signal the absence of the replacement driver 421R via an attached network—e.g., WAN 129 of FIG. 1. If no driver can be loaded, a different replacement part is preferably obtained or a replacement driver 421R can be provided explicitly—i.e., manually by a repairperson.

When the replacement driver 421R is located, the operating system 430 connects the new hardware to the ATM 400A via the replacement driver 421R. After the connection of the new hardware, the operating system 430 may enable a self-test of the new hardware. The self-test may be a test orchestrated by the operating system 430, driver 421R, the hardware itself or any other suitable mechanism.

During the period when the replacement hardware is unavailable the ATM may be able to compensate for the failure—e.g., the emptiness or failure of the $20.00 bill item cartridge can be compensated for by feeding the appropriate number of $10.00 bills.

ATM 400A may also tolerate an upgrade of a hardware portion via the same mechanism described above. For true fault tolerance all single points of failure may be eliminated including the use of redundant computers 101 and/or redundant connections to redundant networking links. The operating system 430 should preferably be configured to accept multiple computers 101 and to tolerate the loss of one or more computers 101.

The uptime of the ATM can also be improved by the use of a virtual machine or virtual disk mechanism. FIG. 4C shows an embodiment of an ATM system 400C. As described above with respect to ATM system 400A; ATM system 400C relies on an underlying hardware layer 410. A hardware layer 410 may contain memory 115, receipt printer 320, display 202, keyboard 204, card reader 206 and computer 101. The elements of hardware layer 410 may be accessed by a driver layer 420. Driver layer 420 is typically comprised of individual drivers, 421A-421F, one for each type of hardware. Some of the devices in the hardware layer may interface to subsidiary hardware devices. Some portions of the hardware layer 410 may not require a driver—e.g., the computer 101.

The operating system 430 may be dependent on the driver layer 420. It is also possible to combine the driver layer 420 with the operating system 430. Virtual machines 440A and 440B are dependent on operating system 430. Each virtual machine simulates a complete hardware environment which may include virtual disks 441A-441B. Applications 450A and 450B run on top of a virtual machine 440A. Application 450C may run on a different virtual machine 440B. The virtual machines 440A-440B may provide access to actual hardware in hardware layer 410 via operating system 430 and driver layer 420.

If the software of an application—e.g., application 450A—has a bug, the fault may cause the virtual machine 440A to "crash". Because the virtual machine 440A is a program run by the operating system, service may be restored without rebooting the hardware 410 or the operating system 430. The restoration may even be automatically triggered based on pre-defined criteria.

If an application is updated to a new version the virtual machine and/or virtual disk environment may be used to improve reliability of the ATM. When the upgrade process begins the current state of the virtual machine—e.g., virtual machine 440A may be saved as a separate environment—e.g., as application 450C running on virtual machine 440B. The saved virtual machine may be suspended or the state of the virtual machine may be stored. In the alternative a copy of virtual disk 441A is stored, perhaps as virtual disk 441B. The stored virtual disk may contain the older version of applications and/or operating systems and/or virtual machines.

Next, the upgraded program 450A' (not shown) is initialized using the current state of the virtual machine 450A. Should a problem occur the older, presumably more functional program, may be "rolled back". It is assumed for the purposes of this description of this embodiment that the new program has corrupted the virtual machine state and/or the virtual disk.

The roll back process may require restoring the old program 450A in place of the "upgraded" program 450A'. The roll back may be implemented by shutting down virtual machine 440A and activating suspended virtual machine 450B, or by transferring the stored state of virtual machine 450B to virtual machine 450A and restarting application 450A. In the alternative the virtual disk 441B may be used to replace corrupted virtual disk 441A. Each of these mechanisms restore computer 101 to the previous environment. The rollback procedure provides a robust mechanism to restore service in the event that the "upgrade" is flawed for a given ATM system 400B. The virtual machine and/or virtual disk preferably allow a retraction of the flawed upgrade.

If the rollback process fails, perhaps due to corruption of the stored environment, a viable rollback environment is preferably located. First, the operating system requests a replacement environment from locally available machines possibly using switch 170 or LAN 125 of FIG. 1. If the replacement environment is not available locally the operating system 430 requests the replacement environment from other available source(s) possibly using WAN 129 of FIG. 1. If the replacement environment is not available from any connected resource the operating system 430 will signal the absence of the replacement environment via an attached network—e.g., WAN 129 of FIG. 1. If no environment can be loaded, a replacement environment can be provided explicitly—i.e., manually by a repairperson.

Although FIG. 4C depicts two virtual machines, more than two or only one virtual machine may be used. Several or all applications may share a virtual machine as is depicted with respect to virtual machine 440A. In the alternative, each application may reside on a single virtual machine as is depicted with respect to virtual machine 440B. Virtual machines 440A-440B may use storage on virtual disks 441A-441B. In the alternative, virtual machines 440A-440B may use the actual storage of memory 115 via driver 421A. In certain embodiments the virtual machines may be combined with the operating system and or become a service of the operating system. Or, the operating system may dispense with the virtual machine environment and provide access to virtual disks 441A and 441B. Each of these alternatives and any possible combination of the alternatives are contemplated and included within the scope of the invention.

Although the use of a virtual machine is described separately, the combination of mechanisms is contemplated and included within the scope of the invention.

Figure 4D:
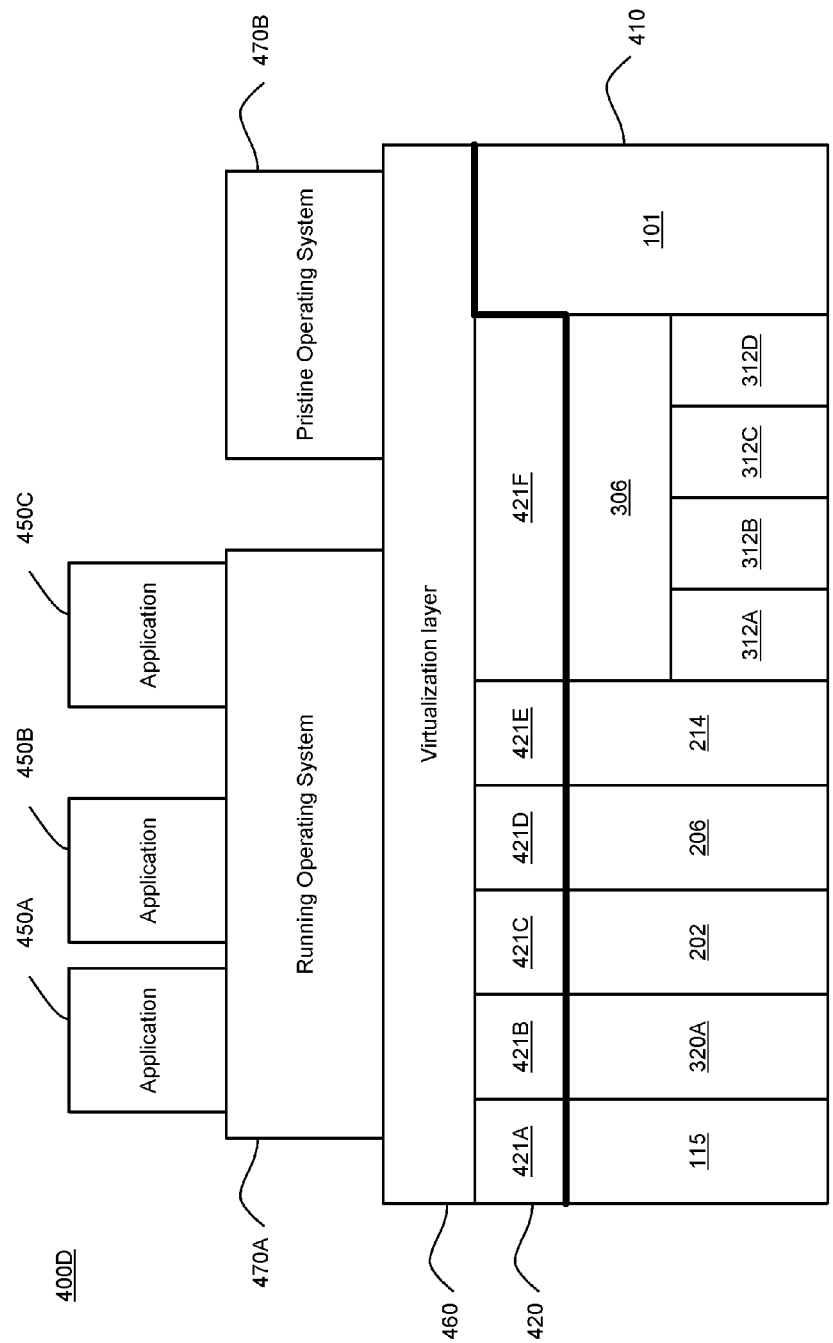
FIG. 4D shows another exemplary architecture of an ATM utilizing a virtual environment.

In another embodiment of the ATM a virtualization layer may be used. FIG. 4D shows an embodiment of an ATM system 400D. As described above with respect to ATM system 400A; ATM system 400C relies on an underlying hardware layer 410. A hardware layer 410 may contain memory 115, receipt printer 320, display 202, keyboard 204, card reader 206 and computer 101. The elements of hardware layer 410 may be accessed by a driver layer 420. Driver layer 420 is typically comprised of individual drivers, 421A-421F, one for each type of hardware. Some of the devices in the hardware layer may interface to subsidiary hardware devices. Some portions of the hardware layer 410 may not require a driver—e.g., the computer 101.

A virtualization layer 460 on top of the driver layer 420. It is also possible to combine the driver layer 420 with the virtualization layer 460. A running operating system 470A and an alternate operating system 470B may be layered on top of virtualization layer 460. The running operating system 470A is the operating system used by the ATM system 400D. All applications 450A-450C run on top of running operating system 470A.

The running operating system 470A may access the hardware in hardware layer 410 via virtualization layer 460 and driver layer 420. An alternate embodiment may connect some or all of the drivers directly to the running operating system 470A. In yet another embodiment some or all of the drivers may be incorporated into the running operating system 470A.

Alternate operating system 470B may be an exact backup copy of the running operating system 470A. Other implementations may keep an older version of running operation system 470A as alternate operating system 470B. Alternate operation system 470B may contain older versions of drivers 421A-421F. As part of a rollout procedure of new software alternate operating system 470B may be a new version or a partial build of a new version of the running operating system 470A. Alternate operating system 470B may be used in a "dual boot" arrangement alongside running operating system 470A and may be used by some or all of the applications 450A-450B.

If the software of an application e.g., application 450A—has a bug, the fault may cause the running operating system 470A to "crash". Because the running operating system 470A is a program run by the virtualization layer 460, service may be restored without rebooting the hardware 410. The restoration may even be automatically triggered based on pre-defined criteria.

If an application or the running operating system 470A is updated to a new version, virtualization layer 460 may be used to improve reliability of the ATM. When the upgrade process begins the current state of the running operating system 470A may be saved as a separate environment. In the alternative a copy of a virtual disk may be stored. The stored virtual disk may contain older versions of applications and/or operating systems and/or virtual machines.

Next, the alternate operating system 470B is initialized using the current state of the operating system 470A. Should a problem occur, the older, presumably more functional operating system, may be "rolled back". It is assumed for the purposes of this description of this embodiment that the new operating systems or application has corrupted the virtual machine state and/or the virtual disk.

The roll back process may require restoring the old running operating system 470A in place of the "upgraded" alternate operating system 470B. The roll back may be implemented by shutting down alternate operating system 470B and activating running operating system 470A. In the alternative the virtual disk may be used to replace corrupted files needs by the restored operating system. Each of these mechanisms restore computer 101 to the previous environment. The rollback procedure provides a robust mechanism to restore service in the event that the "upgrade" is flawed for a given ATM system 400D. The virtual layer and/or virtual disk preferably allow a retraction of the flawed upgrade.

If the rollback process fails, perhaps due to corruption of the stored environment, a viable rollback environment is preferably located as described above in reference to ATM system 400C.

Although FIG. 4D depicts two operating systems, more than two or only one operating system may be used. Several or all applications may share an operating system as is depicted with respect to running operating system 470A. In the alternative, each application may reside on a single operating system. Operating systems 470A-470B may use storage on virtual disks. In the alternative, the virtualization layer may use the actual storage of memory 115 via driver 421A. In certain embodiments the virtualization layers may be combined with the operating system and or become a service of the operating system. Each of these alternatives and any possible combination of the alternatives are contemplated and included within the scope of the invention.

Although the use of a virtual machine is described separately, the combination of virtual machines and virtualization layer supporting multiple operating systems is contemplated and included within the scope of the invention.

Thus, methods and apparatus for configuring ATM based on hot swaps and virtual environments have been provided. Persons skilled in the art will appreciate that the present invention can be practiced by other than the described embodiments, which are presented for purposes of illustration rather than of limitation, and that the present invention is limited only by the claims that follow.

What is claimed is:

1. A continuous-operation money withdrawal system comprising:
    an automatic teller machine (ATM) comprising:
        at least one ATM computer comprising:
            at least one central processing unit;
            at least one memory;
            at least one ATM device interface;
            at least one ATM device connected to the device interface and including at least one of:
                a touchscreen;
                a biometric sensor;
                a contactless chip scanner;
                a wireless transceiver;
                a phone scanner; and
                a smart card reader; and
            at least one ATM software program running on the at least one computer, the at least one software program running on the at least one ATM computer comprising at least two ATM virtual environments, wherein a failure in at least one of the at least two virtual environments does not cause a failure of the automatic teller machine to provide at least one ATM function including at least one of:
        displaying account information;
        withdrawal of cash from the ATM; and
        depositing of at least one document into the ATM;
    wherein at least one of the at least two ATM virtual environments comprises at least one ATM virtual machine;
    wherein the failure in the at least one of the at least two ATM virtual environments triggers replacement of the at least one of the at least two ATM virtual environments by another of the at least two ATM virtual environments;
    wherein the at least one ATM virtual machine comprises at least two ATM virtual disks;
    wherein the failure in the at least one ATM virtual environment triggers replacement of at least one of the at least two ATM virtual disks by another of the at least two virtual disks;
    wherein the at least one software program is restarted in the at least one virtual environment utilizing the other of the at least two virtual disks;
    wherein the computer tolerates removal of a portion of the computer and of the at least one device;
    wherein the memory includes machine-readable instructions for causing the processing unit to perform at least one process enabling, via the touchscreen, a customer presenting to the interface a payment instrument to, during the failure in the at least one of the virtual environments, perform, via the interface, the ATM function;
    wherein, the at least one process includes:
        the replacement of the at least one of the ATM virtual environments by the other of the ATM virtual environments; and
        the replacement of the at least one of the ATM virtual disks by the other of the virtual disks;
    wherein the payment instrument includes at least one of:
        a chip;
        an RFID tag;
        a smart card; and
        a phone; and wherein the memory includes instructions enabling the ATM function during the removal, the tolerating including the enabling.

2. The system of claim 1 wherein the at least one computer tolerates the attachment of at least one device to the automatic teller machine.

3. The system of claim 2 wherein the at least one software program tolerates the attachment of the at least one device to the automatic teller machine.

4. The system of claim 2 wherein the at least one software program allows the attachment and incorporates the at least one device to the automatic teller.

5. The system of claim 2 wherein the at least one software program acknowledges the attachment of the at least one device to the automatic teller machine.

6. The system of claim 5 wherein the at least one software program acquires at least one driver in response to the attachment of the at least one device to the automatic teller machine.

7. The system of claim 2 wherein the at least one software program signals at least one other software program concerning the attachment of the at least one device to the automatic teller machine.

8. The system of claim 1 wherein the at least one computer tolerates the attachment of at least one additional portion of the computer to the at least one computer.

* * * * *